United States Patent [19]

Mehren

[11] 4,244,186
[45] Jan. 13, 1981

[54] BRAKE INSTALLATION

[75] Inventor: Herbert Mehren, Ludwigsburg, Fed. Rep. of Germany

[73] Assignee: Daimler-Benz Aktiengesellschaft, Fed. Rep. of Germany

[21] Appl. No.: 913,062

[22] Filed: Jun. 6, 1978

[30] Foreign Application Priority Data

Jun. 8, 1977 [DE] Fed. Rep. of Germany ....... 2725941

[51] Int. Cl.³ ............................................. F15B 7/00
[52] U.S. Cl. .................................. 60/560; 60/547 R; 60/581; 60/582; 91/433
[58] Field of Search ..................... 60/547 R, 550, 551, 60/552, 553, 560, 563, 565, 566, 567, 582, 593, 548, 581; 91/391 R, 433

[56] References Cited

U.S. PATENT DOCUMENTS

| 3,184,921 | 5/1965 | Allen | 60/582 |
|---|---|---|---|
| 3,827,242 | 8/1974 | Belart | 60/552 |
| 3,898,913 | 8/1975 | Hendrickson | 91/433 |
| 3,935,709 | 2/1976 | Mathues | 60/547 R |
| 4,114,376 | 9/1978 | Cattanco | 60/582 |

FOREIGN PATENT DOCUMENTS 2411701 9/1975 Fed. Rep. of Germany ............. 60/551

*Primary Examiner*—Abraham Hershkovitz
*Attorney, Agent, or Firm*—Craig & Antonelli

[57] ABSTRACT

A hydraulic brake pressure control installation with a master brake cylinder actuatable by a plunger of the pedal. The plunger acts on the master brake cylinder by way of a piston rod of an adjusting cylinder which is arranged ahead of the master brake cylinder and which includes a connecting nipple on the side of the adjusting cylinder piston facing the brake pedal, with which a feed line leading to an electro-hydraulic two-stage control valve is connected. The control valve is adjusted by a control signal, and is operable to connect the feed line with either a supply pressure line or with a pressureless return line.

12 Claims, 1 Drawing Figure

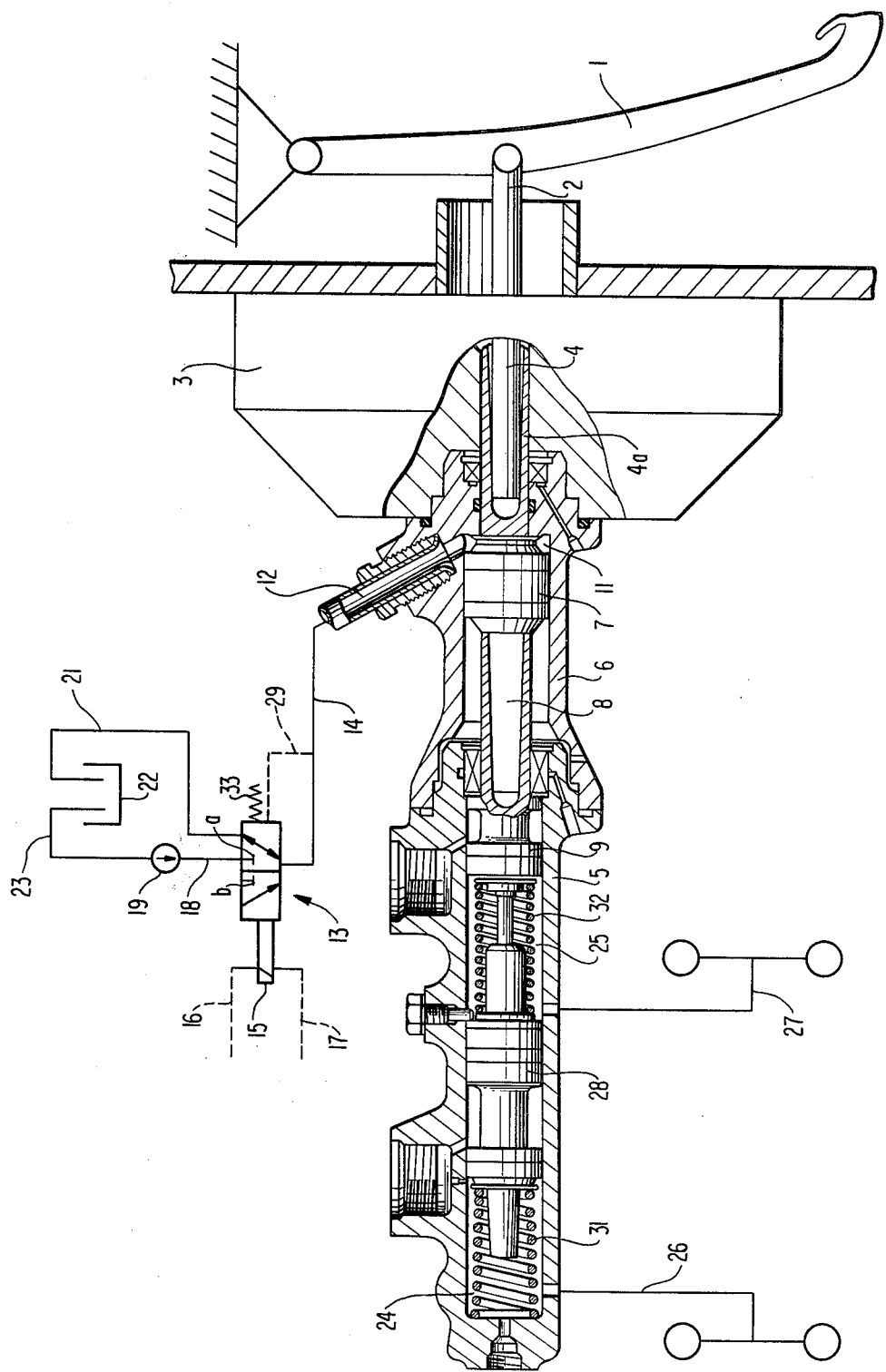

BRAKE INSTALLATION

The present invention relates to a hydraulic brake pressure control mechanism with a master brake cylinder actuatable by a plunger of the brake pedal either directly or indirectly by way of a brake force booster or servo device.

Hydraulic brake pressure control systems of this type are not suitable without further measures to be used for motor vehicles which are controlled automatically and which, for example, are electronically controlled longitudinally.

It is, therefore, the task of the present invention to develop for the electronic longitudinal control of motor vehicles a brake-adjusting mechanism, by means of which the hydraulic pressure present in a motor vehicle and used for the actuation of the brakes can be adjusted in the brake system on the side of the motor vehicle proportionally to an electronic adjusting signal.

The underlying problems are solved according to the present invention in that the plunger of the brake pedal or of the brake force booster or servo device acts on the master brake cylinder indirectly by way of a piston rod of an adjusting cylinder which is arranged directly or indirectly ahead of the master brake cylinder and which includes a connecting nipple leading to a working chamber on the side of the adjusting cylinder piston facing the brake force booster or the brake pedal, whereby a line leading to an electro-hydraulic, two-stage control valve is connected to the connecting nipple, and whereby the valve, adjusted or displaced by a control signal, connects the feed line either with a supply pressure line or with a pressureless return line leading to a reservoir tank.

According to a further feature of the present invention, the pressure prevailing in the working chamber may act by way of a branch line branching off from the feed line against the pilot pressure of the electro-hydraulic transducer in the control valve and upon reaching a hydraulic pressure in the working chamber proportional to the electric control signal, may separate the connection between the supply line and the working chamber. The control valve may be actuated by an electronic longitudinal control system of any known type of a positively controlled motor vehicle. The control valve will thereby either be a solenoid valve or an electro-hydraulic proportional valve.

Accordingly, it is an object of the present invention to provide a hydraulic brake pressure control system of the type described above which avoids by simple means the aforementioned shortcomings and drawbacks encountered in the prior art.

Another object of the present invention resides in a hydraulic brake pressure control installation which can be readily used with motor vehicles that are automatically controlled, especially in their longitudinal motion.

A further object of the present invention resides in a brake system with a brake pressure control installation which is capable of adjusting the hydraulic pressure used for the actuation of the brakes in proportion to an electronic control signal.

Still another object of the present invention resides in a brake installation of the type described above which is highly reliable and safe in operation, even in case of failure of any part of the system.

These and other objects, features and advantages of the present invention will become more apparent from the following description when taken in connection with the accompanying drawing which shows, for purposes of illustration only, one embodiment in accordance with the present invention, and wherein:

The single FIGURE is a somewhat schematic view, partly in cross section, through a brake pressure control installation in accordance with the present invention.

Referring now to the single FIGURE of the drawing, a brake pedal 1 is illustrated therein which is able to act by way of a brake pedal rod 2 on a vacuum brake force booster or servo-device 3 of conventional construction. The plunger 4 of the brake force booster 3 acts indirectly on a master brake cylinder 5. More particularly, an adjusting cylinder 6 is interconnected between the master brake cylinder 5 and the brake force booster 3. The piston 7 of this adjusting cylinder 6 is supported by way of a piston rod 8 at the piston 9 of the master brake cylinder 5. The adjusting cylinder 6 includes on the side of the adjusting cylinder piston 7 facing the brake force booster 3 a connecting nipple 12 leading to a working chamber 11, with which a feed line 14 leading to a conventional electro-hydraulic two-stage control valve generally designated by reference numeral 13 is connected. Two electric lines 16 and 17 are connected to the solenoid of magnet 15 of the control valve 13, by way of which electric control pulses from an electric control device (not shown) of any conventional construction and producing the control signals, are fed to the solenoid valve 13. The control valve 13 is displaced from the position a illustrated in the drawing into the position b by control pulses fed to the control valve 13. As a result thereof, a hydraulic medium is pumped into the working chamber 11 of the adjusting cylinder 6 from the supply line 18 which comes from a pump 19. In the other case, in contrast thereto, when the control valve 13 assumes the position a, the feed line 14 becomes pressureless and is connected with a reservoir tank 22 by way of the discharge line 21.

The electro-hydraulic control system of the brake pressure in the hydraulic brake installation on the vehicle side takes place in the following manner.

The control valve 13 is displaced by the electric control signal from the position a into the position b so that the hydraulic medium can flow from the supply line 23, 18 by way of the feed line 14 into the working chamber 11 of the adjusting cylinder 6. This in-flowing hydraulic medium displaces the working piston 7 and therewith the piston rod 8, which displaces the working piston 9 of the master brake cylinder 5 in its operating or working direction. A pressure builds up in the working chambers 24 and 25 of the master brake cylinder 5 as well as in the lines 26 and 27 of the hydraulic brake system by reason of the displacement of the pistons 7, piston rod 8, and pistons 9 and 28. This pressure acts by way of the piston rod 8 back on the piston 7 of the adjusting cylinder 6 so that also the pressure in the working chamber 11 of the adjusting cylinder 6 rises in proportion to the hydraulic pressure in the brake system. This pressure acts by way of the feed line 14 and by way of a branch line 29 branching off from the feed line 14 against the pilot control pressure of the electro-hydraulic transducer in the control valve 13 and upon reaching a hydraulic pressure in the working chamber 11 proportional to the electric control signal, interrupts the connection between the hydraulic supply line 18 and the working chamber 11.

The pressure in the hydraulic brake system thus changes proportionally to the electric control signal.

The driver of the vehicle can actuate the brake at any time independently of whether the automatic control system is engaged or not. When no electric control signal is provided, the control valve 13 is in the position a so that the working chamber 11 is connected by way of the line 14 and by way of the pressureless return line 21 with a reservoir tank 22 of the hydraulic supply system. If the driver actuates the brake pedal with a disengaged electric control system, then this pedal movement and the pedal force is transmitted onto the plunger 4 either directly or amplified by way of the vacuum pressure brake force booster 3. The plunger 4 acts on the working piston 7 of the adjusting cylinder 6 and displaces this piston and therewith also the pistons 9 and 28 of the master brake cylinder 5 so that a brake pressure builds up in the hydraulic lines 24 and 25 of the brake system. The volume of the working chamber 11 increases as a result of this displacement of the working piston 7, and liquid out of the reservoir tank 22 of the hydraulic supply system can flow back into the working chamber 11 by way of the control valve 13 which is in the position a. Upon release of the brake pedal 1, the pressure in the brake system together with the return springs 31 and 32 displaces the working piston 7 again into its end position and a portion of the hydraulic medium is forced out of the working chamber 11 and out of the lines 14 and 21 connected thereto back into the reservoir tank 22 of the hydraulic supply system.

However, the driver of the motor vehicle can also additionally actuate the brake when the electro-hydraulic brake is automatically actuated. With an electro-hydraulic braking, a pressure proportional to the electric control signal prevails in the working chamber 11 of the adjusting cylinder 6 as well as in the brake system, and the piston 7 has already traversed a predetermined piston travel or stroke.

If the driver now actuates the brake pedal 1, then at first he has to overcome the pressure at the end face of the plunger 4. If the brake force is larger than the force conditioned by the pressure in the working chamber 11, then the plunger 4 is displaced for such length of time until it abuts at the back side of the working piston 7 so that the brake force of the driver is added to the electro-hydraulic brake action at the piston 9 of the master brake cylinder 5. Consequently, the driver thus possesses at all times the possibility to reinforce or enhance the braking action of the electro-hydraulically actuated brakes.

The plunger 2 of the brake pedal 1 or the plunger 4 of the brake force booster 3 acts on a sleeve 4a which has a collar or offset that abuts at a shoulder in the housing 6 upon actuation of the electro-hydraulic brake. As a result thereof, the brake pedal remains in its rest position with an electro-hydraulic actuation of the brake.

In case of failure of the electro-hydraulic brake actuation, the driver of the vehicle can continue to actuate the brake. During the failure of an electric control signal or of the hydraulic supply system of the electro-hydraulic brake actuating installation, the control valve 13 will adjust itself into the position a due to a return spring 33 so that the driver can actuate the brake unimpairedly by way of the brake pedal.

The installation according to the present invention can be utilized for the external electric brake actuation in motor vehicles with a hydraulic brake system. However, it can also be utilized for the longitudinal control of motor vehicles with hydraulic brake systems.

An advantage of the installation according to the present invention resides in the fact that every motor vehicle which includes a hydraulic brake system, can be equipped with the electro-hydraulic brake actuating installation according to the present invention without large expenditures for the change.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A hydraulic brake pressure control installation, comprising master break cylinder means, a brake force booster means interposed between the master brake cylinder means and a brake pedal means, characterized in that an adjusting cylinder means is arranged between the brake force booster means and the master break cylinder means for adjusting the hydraulic pressure used for actutation of brakes, the adjusting cylinder means includes an adjusting cylinder piston means and a piston rod means adapted to be supported by a piston means of the master brake cylinder means, the adjusting cylinder means further includes a working chamber means on a side of the adjusting cylinder piston means facing the brake force booster means, a control valve means is provided for controlling a supply of a hydraulic medium to the working chamber means of the adjusting cylinder piston means, a connecting nipple is provided on the adjusting cylinder means and leads to the working chamber means, a feed line leads to the control valve means and is operatively connected with said connecting nipple, means are provided for producing a control signal to enable an electro-hydraulic actuation of the brakes, said control valve means is operable to connect the feed line either with a supply pressure line or with a substantially pressureless return line, and in that means are provided for causing an interruption in a supply of hydraulic medium to the working chamber means upon a pressure of the hydraulic medium in the working chamber means reaching a pressure proportional to the control signal.

2. An electro-hydraulic brake pressure control installation according to claim 1, characterized in that the return line leads to a reservoir tank.

3. An electro-hydraulic brake pressure control installation according to claim 1, characterized in that the control valve means is a two-stage electro-hydraulic pressure control valve.

4. An electro-hydraulic brake pressure control installation according to claim 1, characterized in that the brake pedal means includes a plunger adapted to act upon the brake force booster means.

5. An electro-hydraulic brake pressure control installation according to claim 1, or 4, characterized in that the control valve means is actuated by an electronic longitudinal control means of a positively controlled motor vehicle.

6. An electro-hydraulic brake pressure control installation according to claim 5, characterized in that the control valve means is a two-stage electro-hydraulic pressure control valve.

7. An electro-hydraulic brake pressure control installation according to claim 1, or 4, characterized in that one of a plunger of the brake pedal means and a plunger of the brake force booster means acts on a sleeve, and in that said sleeve includes an offset means adapted to abut against a shoulder of the adjusting cylinder means with an electro-hydraulic actuation of the brake so that the brake pedal means remains in a rest position with an electro-hydraulic brake actuation.

8. An electro-hydraulic brake pressure control installation, comprising master brake cylinder means, a brake force booster means interposed between the master brake cylinder means and a brake pedal means, characterized in that an adjusting cylinder means is arranged between the brake force booster means and the master brake cylinder means for adjusting the hydraulic pressure used for actuation of brakes, the brake pedal means includes a plunger adapted to act upon the brake force booster means, the adjusting cylinder means includes an adjusting cylinder piston means and a piston rod means adapted to be supported by a piston means of the master brake cylinder means, the adjusting cylinder means further includes a working chamber means on a side of the adjusting cylinder piston means facing the brake force booster means, means are provided for producing a control signal so as to enable an electro-hydraulic actuation of the brakes, a connecting nipple is provided on the adjusting cylinder means and leads to the working chamber means, a feed line leads to a control valve means and is operatively connected with said connecting nipple, the control valve means is controlled by said control signal and is operable to connect the feed line either with a supply pressure line or with a substantially pressureless return line, a branch line means branches off from the feed line for enabling a pressure prevailing in the working chamber means to act against a pilot control of an electric control signal applied to the control valve means, and in that, upon a reaching of a hydraulic pressure in the working chamber means proportional to the electric control signal, a connection between the supply pressure line and the working chamber means is interrupted by the control valve means.

9. An electro-hydraulic brake pressure control installation according to claim 8, characterized in that the control valve means is actuated by an electronic longitudinal control means of a positively controlled motor vehicle.

10. An electro-hydraulic brake pressure control installation according to claim 9, characterized in that the control valve means is a two-stage electro-hydraulic pressure control valve.

11. An electo-hydraulic brake pressure control installation according to claim 10, characterized in that one of a plunger of the brake pedal means and a plunger of the brake force booster means acts on a sleeve, and in that said sleeve includes an offset means adapted to abut against a shoulder of the adjusting cylinder means with an electro-hydraulic actuation of the brake so that the brake pedal means remains in a rest position with an electro-hydraulic brake actuation.

12. An electro-hydraulic brake pressure control installation, comprising master brake cylinder means actuatable by a plunger of a brake pedal means, a brake force booster means interposed between the master brake cylinder means and the brake pedal means, characterized in that the plunger of the brake pedal means acts on the master brake cylinder means by way of a piston rod of an adjusting cylinder means which is arranged ahead of the master brake cylinder means and which, on a side facing the brake pedal means, includes a connecting nipple leading to a working chamber means, a feed line leading to a control valve means being operatively connected with said connecting nipple, means are provided for producing a control signal so as to enable an electro-hydraulic actuation of the brakes, the control valve means being controlled by the control signal and being operable to connect the fed line either with a supply pressure line or with a substantially pressureless return line, a pressure prevailing in the working chamber means acts by way of a branch line branching off from the feed line against a pilot control of an electric control signal applied to the control valve means and, upon reaching a hydraulic pressure in the working chamber means proportional to the electric control signal, separates a connection between the supply pressure line and the working chamber means, one of the plunger of the brake pedal means and a plunger of the brake force booster means acts on a sleeve, and in that said sleeve includes an offset means adapted to abut against a shoulder of the adjusting cylinder means with an electro-hydraulic actuation of the brake so that the brake pedal means remain in a rest position with an electro-hydraulic brake actuation.

* * * * *